Aug. 23, 1960 L. H. ROWLEY 2,950,472

DIGITAL TO ANALOG CONVERTER

Filed Oct. 18, 1956

INVENTOR.
LOTHAIR H. ROWLEY
BY Victor D. Borst
ATTORNEY 2,950,472
Patented Aug. 23, 1960

2,950,472

DIGITAL TO ANALOG CONVERTER

Lothair H. Rowley, Syosset, N.Y., assignor to Sperry Rand Corporation, Ford Instrument Company Division, Long Island City, N.Y., a corporation of Delaware Filed Oct. 18, 1956, Ser. No. 616,693

3 Claims. (Cl. 340—347)

This invention relates to binary signal systems employing a shaft encoder for matching binary input signals and more particularly to a digit by digit comparator which is insensitive to minor differences in the matched two voltages levels of a corresponding state.

In individual digit binary signal systems a problem is encountered when the aging of circuit elements produce minor differences in nominally equal voltage levels between the output of a bistable multi-vibrator as driven by a binary input signal and the output of a shaft encoder. The slight difference in the corresponding voltage levels causes a circulating current to flow in the comparison circuitry which produces undesirable unstabilities and errors in the system.

In general, the invention contemplates the employment in each digit comparator circuit of two oppositely polarized diodes of semi-conductor materials having Zener characteristics. By selecting a pair of diodes to have a Zener voltage greater than the maximum anticipated net voltage to be compared in the same state, the high reverse impedance of one diode will prevent undesirable circulating currents in the comparison circuit. The Zener voltage of the selected pair of diodes is designed to be exceeded when the two voltage levels are in different states and breakdown will permit a load current to flow in either direction through the comparison circuit.

Figure 1:
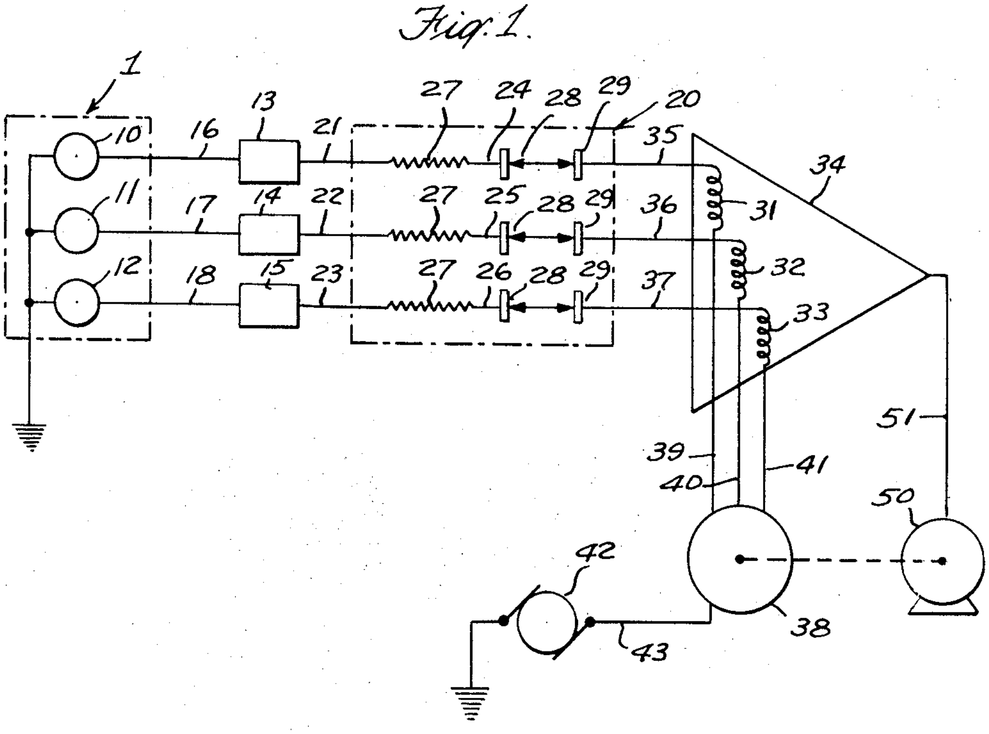
Figure 2:
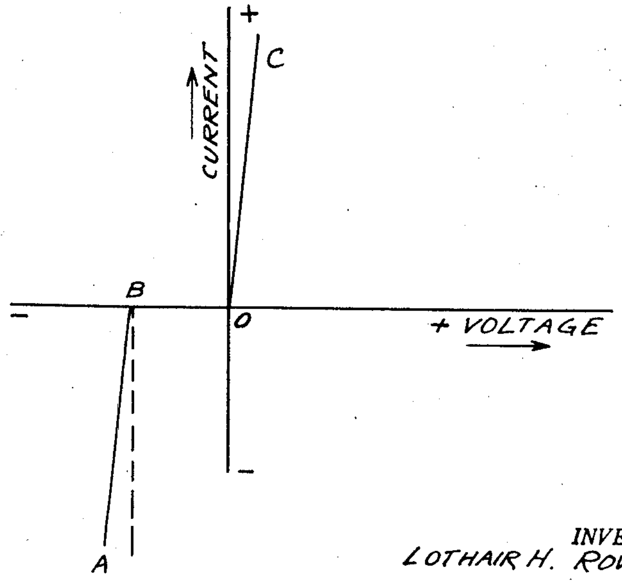

The features of the invention will be understood more clearly from the following detailed description taken in conjunction with the accompanying drawings in which:

Fig. 1 is a schematic diagram of a comparator network connected in a multi-signal binary system employing a shaft encoder; and Fig. 2 is a diagrammatic representation of the impedance characteristics of the diodes employed in the comparator network.

Referring to Fig. 1, a binary multisignal source 1 is represented for explanatory purposes by three individual digit signal sources 10, 11 and 12, each of which has a terminal connected to a common ground potential. The ungrounded terminals of signal sources 10, 11 and 12 are connected to individual bistable multivibrators 13, 14 and 15 by conductors 16, 17 and 18, respectively. The multivibrators are conventional units and are of similar design. The output of the bistable multivibrators 13, 14 and 15 are connected to one side of a comparator network 20 by conductors 21, 22 and 23, respectively. Comparator network 20 comprises three similar series circuits 24, 25 and 26 comprises a resistor 27 and two oppositely polarized diodes 28 and 29. Series circuits 21, 22 and 23 of comparator network 20 are connected to input control windings 31, 32 and 33, of magnetic amplifier 34 by conductors 35, 36 and 37, respectively. Except for the three control windings on the cores, the magnetic amplifier 34 is the same as the half wave magnetic amplifier shown in Patent No. 2,636,150, entitled "Magnetic Amplifier System." That is, the single, split, control winding shown on each core of the first stage in the patented circuit is here replaced by the three control windings 31, 32, 33. The control windings 31, 32 and 33 are weighted so that the digit having the highest values will have the highest number of turns, each winding being larger than a combination of all the control windings which have fewer turns, thereby controlling the direction of a motor 50. That is, the direction of the motor will be determined by the polarity of the largest, operating, control winding on the magnetic amplifier, since a combination of the other operating, control windings, even though each of them is opposite in polarity to the largest, operating winding, would not be sufficient to overcome the effect of the latter on the polarity of the amplifier output. Because of this weighting of the control windings, the output voltages of the amplifier 34 are yielded in successively descending order. The other sides of control windings 31, 32 and 33 are connected to the output of a binary shaft encoder 38 by conductors 39, 40 and 41, respectively. A binary shaft encoder of the type required in the instant circuit is shown in Bulletin 1001 published by the United Aircraft Corporation, Norden Division. The binary shaft encoder 38 is electrically referenced by the D.C. voltage source 42, one terminal of the voltage source 42 being connected to the encoder 38 by a conductor 43, the other terminal of voltage source 42 being connected to ground potential. The magnitude of the D.C. voltage of the source 42 is nominally equal to but normally slightly different from the voltage level of the "on" state of bistable multivibrators 13, 14 and 15. The output of magnetic amplifier 34 is connected to the motor 50 by a pair of conductors 51. The shaft of motor 50 is mechanically connected to and drives the shaft of binary encoder 38, so as to match the encoder wheel of the encoder 38 to the incoming digital information as received by the amplifier 34, thereby providing on the motor shaft an output which is the analog equivalent of the binary signal. This analog is represented on the output shaft of the motor 50 which serves to position the rotary drum of the encoder 38. The encoder 38 operates conventionally to receive the reference voltage from the source 42 and yield output voltages on the conductors 39, 40 and 41 which represent some proportion of the source voltage depending on the analog output of the motor 50. Accordingly, the weighted windings 31, 32 and 33, which are the control windings of the magnetic amplifier 34, receive the binary outputs of the binary multisignal source 1 and the analog outputs of the encoder 38. The weighted windings compare the binary signals and the encoder voltages and the net voltage serves to drive the servo motor 50 until each of the three binary output voltages and the three corresponding encoder voltages are matched. On the matching of each binary signal to its corresponding encoder voltage in the control windings, the servo loop comprising the amplifier 34, the servo motor 50 and the encoder 38 is nulled and the correct analog positioning of the servo motor 50 is assured for each signal.

Fig. 2 is a diagrammatic representation of the impedance properties of the diodes 28 and 29 which are selected from semiconductor materials having Zener characteristics. For such diodes the current versus voltage characteristics is the curve ABOC from which it is evident that the resistance of the device is low for the curve AB and OC but very high for the curve BO. The magnitude of the reverse voltage OB is commonly referred to as the Zener voltage and when two identical diodes 28 and 29 are oppositely polarized in the series circuit 24, the impedance of the two diode combination is very high when the impressed voltage in either direction is less than the Zener voltage OB. When this impressed voltage in either direction is greater than the Zener voltage OB, the reversely polarized diode will break down and the impedance of the two diode combinations will be appreciably reduced. By selecting diodes 28 and 29 to have a Zener voltage slightly greater than the maximum anticipated minor voltage differences between the nominally equal voltage output levels of bistable multivibrators 13, 14 and 15 and the D.C. voltage source 42, parasitic circulating currents in the system originating from this cause are eliminated.

It is to be understood that various modifications of the invention other than those above described may be effected by persons skilled in the art without departing from the principle and scope of the invention as defined in the appended claims.

What is claimed is:

1. A digital to analog converter comprising a multisignal digital signal source, a servo loop connected to said multisignal source, said loop including a magnetic amplifier having a plurality of weighted control windings, a servo motor connected to the output of said amplifier and a referenced binary shaft encoder mechanically connected to the output of said motor, one side of each of said control windings being connected to one source of said multisignal source and the other side of each of the control windings being connected to the output of said shaft encoder, and circuit means connected between each of the control windings and the signal source for preventing operation of said servo loop by reason of nominal voltage discrepancies in the output of the multisignal source and the binary shaft encoder, wherein said circuit includes a plurality of series networks, each of said networks comprising a resistor and two semi-conductor material diodes, said diodes being oppositely poled.

2. A digital to analog converter as claimed in claim 1 wherein a bistable multivibrator is connected between each of said signal sources and said circuit means.

3. A digital to analog converter as claimed in claim 2 wherein said shaft encoder has multi-circuit output connections and each of said weighted control windings are connected between one output connection of the shaft encoder and one pair of said oppositely polarized diodes.

References Cited in the file of this patent

UNITED STATES PATENTS

| | | |
|---|---|---|
| 2,122,748 | Mayer | July 5, 1938 |
| 2,731,631 | Spaulding | Jan. 17, 1956 |
| 2,775,754 | Sink | Dec. 25, 1956 |
| 2,803,815 | Wulfsberg | Aug. 20, 1957 |
| 2,814,006 | Wilde | Nov. 19, 1957 |
| 2,820,937 | Fogiel | Jan. 21, 1958 |
| 2,853,699 | O'Neil | Sept. 23, 1958 |
| 2,860,292 | Towner | Nov. 11, 1958 |